United States Patent
Song et al.

(10) Patent No.: US 9,944,756 B1
(45) Date of Patent: Apr. 17, 2018

(54) GRAFT COPOLYMER BASED ON CARBAZOLE CAPABLE OF CONTROLLING SELF-ASSEMBLED STRUCTURE AND METHOD OF SYNTHESIZING THE SAME

(71) Applicants: Hyundai Motor Company, Seoul (KR); Korea Advanced Institute of Science and Technology, Daejeon (KR)

(72) Inventors: You Jung Song, Suwon-si (KR); Ju Hee Lee, Seoul (KR); Won Jung Kim, Seoul (KR); Bum Joon Kim, Daejeon (KR); Young Kwon Kim, Daejeon (KR); Hyun Jeong Kim, Daejeon (KR)

(73) Assignees: Hyundai Motor Company, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/377,047

(22) Filed: Dec. 13, 2016

(30) Foreign Application Priority Data

Oct. 6, 2016 (KR) .................. 10-2016-0128890

(51) Int. Cl.
C08G 63/02 (2006.01)
C08G 73/06 (2006.01)

(52) U.S. Cl.
CPC .............. C08G 73/0672 (2013.01)

(58) Field of Classification Search
USPC ....................................... 525/418
See application file for complete search history.

(56) References Cited

U.S. PATENT DOCUMENTS 8,809,063 B2  8/2014  Zang et al.
9,079,999 B2  7/2015  Advincula

FOREIGN PATENT DOCUMENTS

JP       4781341 B2       9/2011
WO    WO 2013/010209 A1   1/2013

OTHER PUBLICATIONS

Zhang, Liangshun et al.; Effect of Molecular Architecture on Phase Behavior of Graft Copolymers; *J. Phys. Chem B*; Jul. 17, 2008; p. 9720-9728; vol. 112, No. 32; American Chemical Society; USA.

Kim, Hyeong Jun et al.; Molecular Design of "Graft" Assembly for Ordered Microphase Separation of P3HT-Based Rod-Coil Copolymers; *Macromolecules*; Oct. 31, 2013; p. 8472-8478; 46; American Chemical Society, USA.
Lee, Wonho et al.; Graft Architectured Rod-Coil Copolymers Based on Alternating Conjugated Backbone: Morphological and Optical Properties; *Macromolecules*; Aug. 13, 2015; p. 5563-5569; 48; American Chemical Society; USA.

*Primary Examiner* — Terressa Boykin
(74) *Attorney, Agent, or Firm* — Morgan, Lewis & Bockius LLP

(57) ABSTRACT

A carbazole-based graft copolymer capable of controlling a self-assembled structure and a method of synthesizing the same are provided. Specifically, the copolymer is capable of controlling a self-assembled structure which can control the morphology of a polymer structure and the size of pores by controlling the molecular weights of polylactic acid (PLA) functioning as a coil and of a carbazole copolymer to prepare a poly(carbazole)-coil graft copolymer of Formula 1 below and the method of synthesizing the same is provided. In Formula 1, X represents 0.05 to 0.1, m represents an integer of 7 to 8, and n represents an integer of 56 to 84.

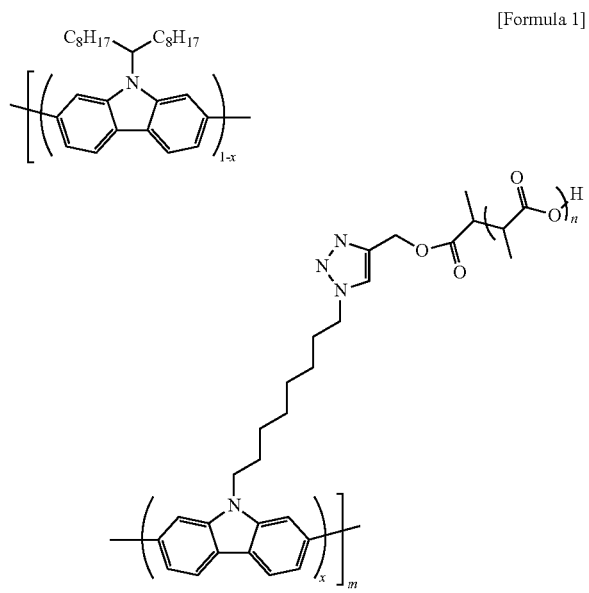

[Formula 1]

6 Claims, 6 Drawing Sheets

GRAFT COPOLYMER BASED ON CARBAZOLE CAPABLE OF CONTROLLING SELF-ASSEMBLED STRUCTURE AND METHOD OF SYNTHESIZING THE SAME

CROSS-REFERENCE TO RELATED APPLICATION

This application claims under 35 U.S.C. § 119(a) benefit to Korean Patent Application No. 10-2016-0128890, filed on Oct. 6, 2016, the entire contents of which are incorporated herein by reference for all purposes.

BACKGROUND

Technical Field

The present disclosure relates to a carbazole-based graft copolymer capable of controlling a self-assembled structure and a method of synthesizing the same. The present invention relates to a novel copolymer capable of controlling a self-assembled structure which can control the morphology of a polymer structure and the size of pores by controlling the molecular weights of polylactic acid (PLA) functioning as a coil and a carbazole copolymer to prepare a poly(carbazole)-coil graft copolymer and a method of synthesizing the same.

Background Art

A conductive copolymer structure which has a nano-scale domain size and a co-continuous morphology can function as a very ideal structure in organic electronic devices in which electron movement routes are considered important.

However, general conductive polymers have limitations both in nano-structures that can be formed by strong interaction between conductive polymers and in selectable conductive polymer blocks. However, it has been shown that a variety of nano-structures can be well arranged by using copolymers in which graft-type polymer blocks are introduced into conductive polymer blocks.

As of yet, conventionally, graft copolymer-type carbazole-based polymers have not been reported. In order to improve applicability of carbazole-based polymers with excellent optical and electrical properties to electronic devices, other block- or graft-type polymer blocks can be introduced.

In the present invention, poly(carbazole)-coil graft copolymers with a graft form, not a block form, can be used even without introducing any functional group into an end of a carbazole main chain.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with the prior art.

The present invention is based, in part, on the finding that a poly(carbazole)-graft-poly(lactic acid) (PCz-g-PLA) graft copolymer can be produced as a poly(carbazole)-coil graft copolymer having self-assembly property by controlling the grafting density of a coil and the molecular weight of a carbazole block copolymer. The poly(carbozole) coil graft copolymers of the present invention as well as the method of producing thereof can be applied to various organic electronic and electrode materials.

In one aspect, the present invention provides a carbazole-based graft copolymer capable of controlling a self-assembled structure.

In some aspects, the present invention provides a method of synthesizing the novel carbazole-based graft copolymer.

In one aspect, the present invention provides a carbazole-based graft copolymer capable of controlling a self-assembled structure, represented by the following Formula 1.

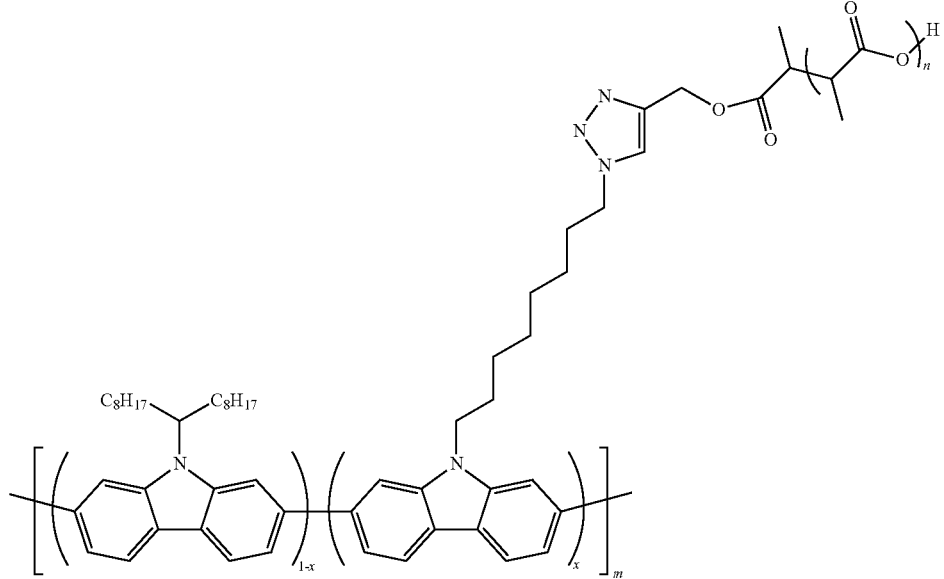

[Formula 1]

wherein X represents 0.05 to 0.1, m represents an integer of 7 to 8, and n represents an integer of 56 to 84.

In certain aspects, the present invention provides a method of synthesizing a carbazole-based graft copolymer represented by the following Formula 1 by click-reacting a polycarbazole copolymer represented by the following Formula 2 with a poly(lactic acid) polymer represented by the following Formula 3.

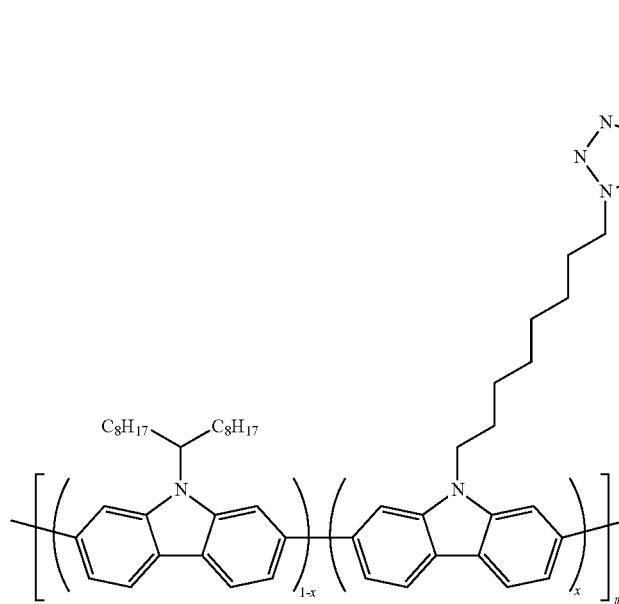

[Formula 1]

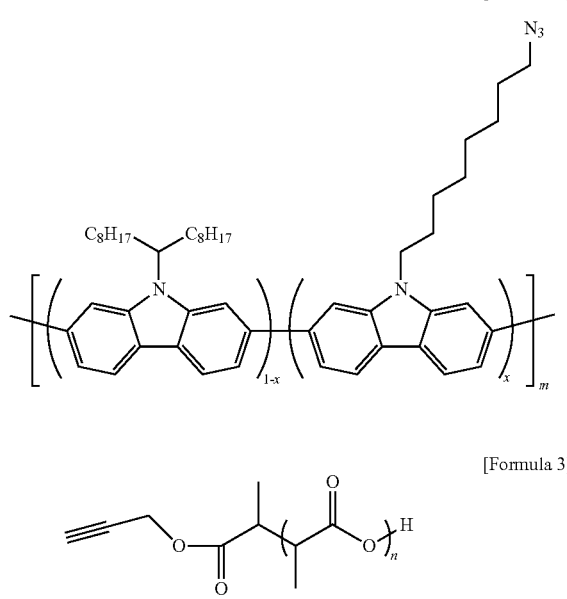

[Formula 2]

[Formula 3]

wherein X represents 0.05 to 0.1, m represents an integer of 7 to 8, and n represents an integer of 56 to 84.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention.

Figure 1:
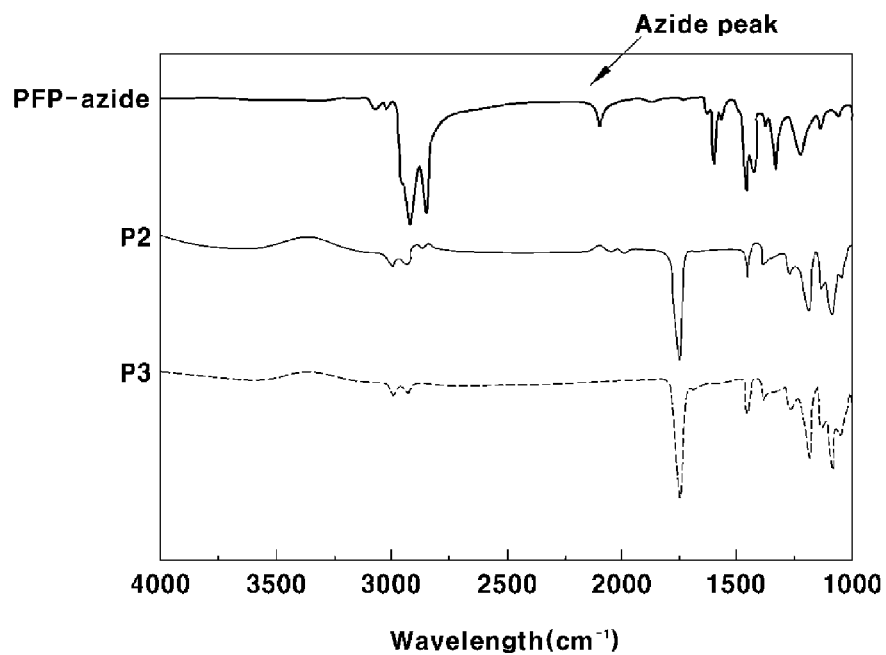
FIG. 1 shows FT-IR analysis results.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, reference will now be made in detail to various embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims. In the following description of the present invention, a detailed description of known functions and configurations incorporated herein will be omitted when it may obscure the subject matter of the present invention.

Hereinafter, preferred embodiments of the present invention will be described in detail.

The present invention provides a graft copolymer-type carbazole-based polymer (PCz-g-PLA graft copolymer) which is a novel polymer compound capable of forming a self-assembled structure and controlling conductivity.

Specifically, the novel compound provided by the present invention is a poly(carbazole)-coil graft copolymer which is formed by grafting poly(lactic acid) onto a carbazole-based copolymer as a main chain, as shown in Formula 1.

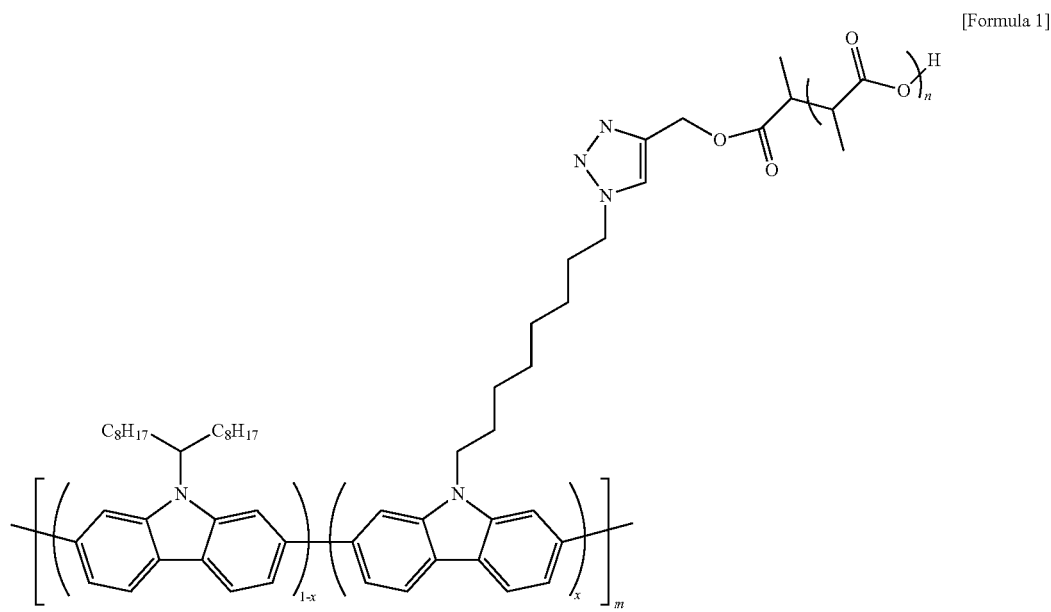

[Formula 1]

wherein X represents 0.05 to 0.1, m represents an integer of 7 to 8, and n represents an integer of 56 to 84.

In certain embodiments, in the copolymer of Formula 1, the carbazole-based copolymer as a main chain has a number average molecular weight of from about 5,000 to 7,000 g/mol (e.g., about 5,000; 5,500; 6,000; 6,500; or about 7,000 g/mol) and the poly(lactic acid) polymer as a side chain has a number average molecular weight of from about 4,000 to 6,000 g/mol (e.g., about 4,000; 4,100, 4,200; 4,300; 4,400; 4,500; 4,600; 4,700; 4,800; 4,900; 5,000, 5,100; 5,200; 5,300; 5,400; 5,500; 5,600; 5,700; 5,800; 5,900; or about 6,000 g/mol). This is because the graft copolymer satisfying the range defined above is capable of forming a self-assembled structure and controlling conductivity. This can be seen from the Test Example described later.

Furthermore, in order to produce a poly(carbazole)-coil graft copolymer, in the present invention, a PCz-g-PLA graft copolymer can be produced by controlling the molecular weights of polylactic acid (PLA) corresponding to the coil and the carbazole-based block polymer (PCz).

In some embodiments, the present invention provides a method of producing a carbazole-based graft copolymer capable of controlling a self-assembled structure by click-reacting a polycarbazole copolymer represented by the following Formula 2 with a poly(lactic acid) polymer represented by the following Formula 3 to synthesize a carbazole-based graft copolymer represented by the following Formula 1.

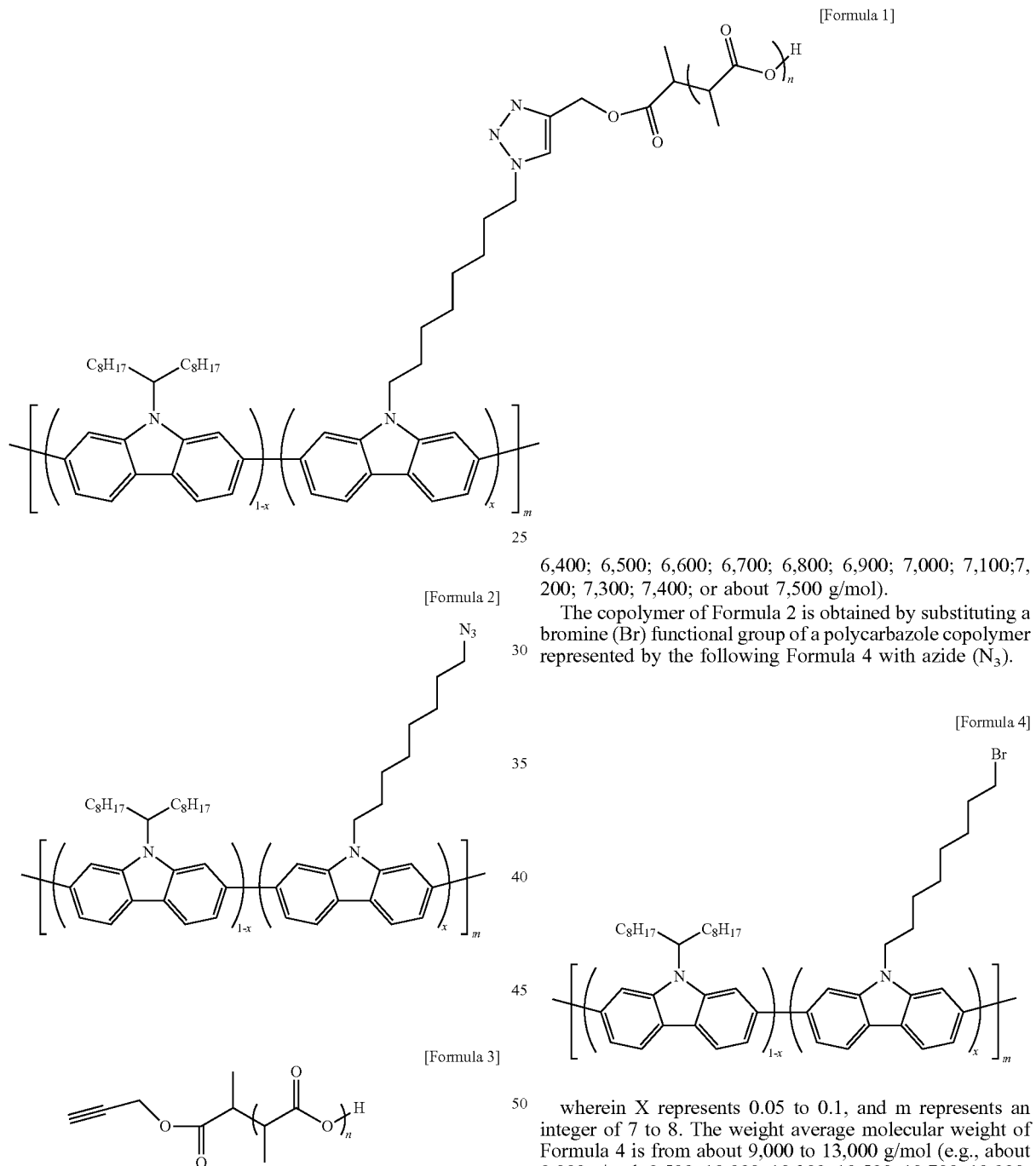

In Formula 1, X represents 0.05 to 0.1, m represents an integer of 7 to 8, and n represents an integer of 56 to 84. Furthermore, the weight average molecular weight of Formula 2 is from about 9,000 to 13,000 g/mol (e.g., about 9,000 g/mol; 9,500; 10,000; 10,300; 10,500; 10,700; 10,900; 11,000; 11,500; 12,000; 12,500; or about 13,000 g/mol), and the weight average molecular weight of Formula 3 is from about 4,500 to 7,500 g/mol (e.g., about 4,500; 4,600; 4,700; 4,800; 4,900; 5,000;5,100; 5,200; 5,300; 5,400; 5,500; 5,600; 5,700; 5,800; 5,900; 6,000, 6,100; 6,200; 6,300; 6,400; 6,500; 6,600; 6,700; 6,800; 6,900; 7,000; 7,100;7, 200; 7,300; 7,400; or about 7,500 g/mol).

The copolymer of Formula 2 is obtained by substituting a bromine (Br) functional group of a polycarbazole copolymer represented by the following Formula 4 with azide ($N_3$).

wherein X represents 0.05 to 0.1, and m represents an integer of 7 to 8. The weight average molecular weight of Formula 4 is from about 9,000 to 13,000 g/mol (e.g., about 9,000 g/mol; 9,500; 10,000; 10,300; 10,500; 10,700; 10,900; 11,000; 11,500; 12,000; 12,500; or about 13,000 g/mol).

The copolymer of Formula 4 is obtained by polymerizing a carbazole monomer represented by the following Formula 5, a carbazole monomer represented by the following Formula 6 and a carbazole monomer represented by the following Formula 7, and preferably contains from about 5 to 10 mol % (e.g., about 5 mol %, 6, 7, 8, 9, or about 10 mol %) of bromine (Br) and has a number average molecular weight of from about 5,000 to 7,000 g/mol (e.g., about 5,000; 5,100; 5,200; 5,300; 5,400; 5,500; 5,600; 5,700; 5,800; 5,900; 6,000; 6,100; 6,200; 6,300; 6,400; 6,500; 6,600; 6,700; 6,800; 6,900; or about 7,000 g/mol) and a PDI of from about 1.5 to 2 (e.g., about 1.5, 1.6, 1.7, 1.8, 1.9, or about 2).

[Formula 5]

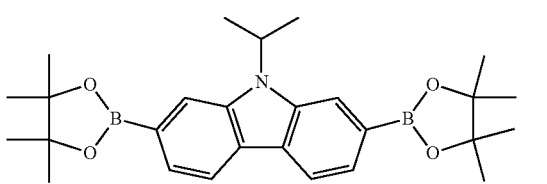

[Formula 6]

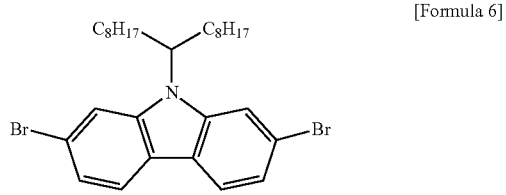

[Formula 7]

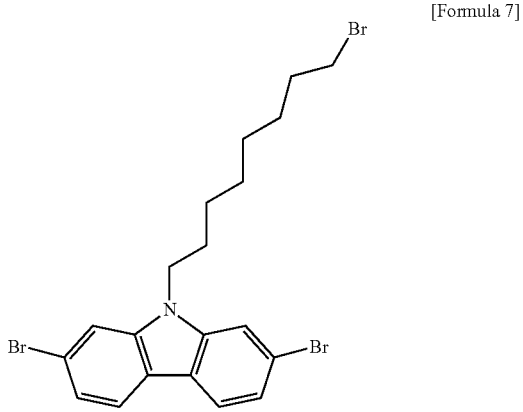 [SMILES: BrCCCCCCCCn1c2cc(Br)ccc2c2ccc(Br)cc21]

The polymer of Formula 3 is obtained by polymerizing a lactone compound represented by the following Formula 8 with an alcohol compound represented by the following Formula 9 and preferably has a number average molecular weight of from about 4,000 to 6,000 g/mol (e.g., about 4,000; 4,100; 4,200; 4,300; 4,400; 4,500; 4,600; 4,700; 4,800; 4,900; 5,000; 5,100; 5,200; 5,300; 5,400; 5,500; 5,600; 5,700; 5,800; 5,900; or about 6,000 g/mol).

[Formula 8]

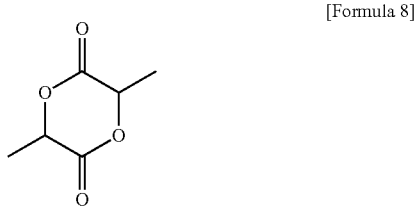

[Formula 9]

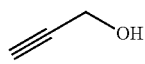

Furthermore, the poly(carbazole)-coil graft copolymer according to the present invention can produce a 3-dimensional polymer structure provided with pores by using polylactic acid (PLA) allowing etching as a coil block or a polymer block such as poly(methyl methacrylate) (PMMA). The 3-dimensional polymer structure thus realized can be applied to organic electronic devices later. In addition, the morphology of the polymer structure and pore size can be controlled by controlling the molecular weights of polylactic acid (PLA) corresponding to the coil and of the polymer block such as poly(methyl methacrylate)(PMMA).

Furthermore, it is important that graft copolymers can be synthesized by easily applying the method suggested by the present invention to other conductive polymers as well as carbazole.

Hereinafter, the present invention will be described in more detail with reference to examples. However, the examples are provided only for illustration of the present invention and the scope of the present invention is not limited to the examples.

Preparation Example 1: Preparation of Carbazole-Based Copolymer

Carbazole-based copolymers (Preparation Examples 1-1 and 1-2) were prepared by the following steps (a) to (c). Specifically, respective steps will be described.

(a) Preparation of Carbazole Monomer Having Br-Terminal Functional Group 1 eq. (700 mg) of 2,7-dibromo carbazol was dissolved in 5 mL of THF and a nitrogen atmosphere was created by degassing. A solution of 2 eq. (103.2 mg) of NaH in 5 mL of THF was added to the resulting solution and was thoroughly stirred at 60° C. for about one hour. To perform the desired reaction, 3 eq. (1.2 mL) of 1,8-dibromo octane was added to the resulting solution and was then reacted under reflux for 18 hours. After the reaction, impurities were removed by extraction with DCM/Di-water and recrystals were collected in hexane to obtain a white solid product. In this process, 476 mg (yield: 42.9%) of 2,7-dibromo-9-(8-bromooctyl)-carbazole was obtained based on 700 mg of the starting material (see Reaction Scheme 1).

[Reaction Scheme 1]

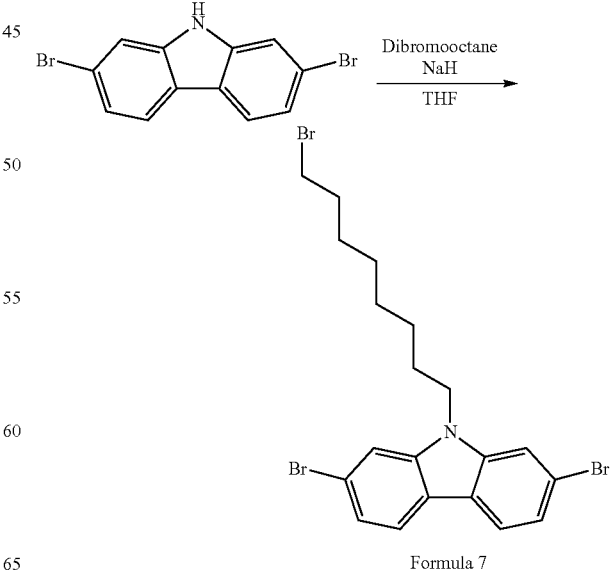

Formula 7

(b) Polymerization of Polycarbazole Having Br-Terminal Alkyl (b-1) Preparation of Polycarbazole Copolymer Having Number Average Molecular Weight of 17 kDa and Br Content of 5 mol %

A 9-heptadecanyl 2,7-bis(4,4,5,5-tetramethyl-1,3,2-dioxaborolan-2-yl)-9H-carbazole monomer (1 eq.) of Formula 5, a 2,7-dibromo-9-(1-octylnonyl)-9H-carbazole monomer (0.9 eq.) of Formula 6 and the 2,7-dibromo-9-(8-bromooctyl)-carbazole monomer (0.1 eq.) of Formula 7 obtained in step (a) were dissolved in 12 mL of toluene and 4.8 mL of a 2M $K_2CO_3$ aqueous solution. A nitrogen atmosphere was created by bubbling with nitrogen for 30 minutes and catalysts (Pd2(dba)3 2 mol %, tri-o-tolylphosphine 8 mol %) were added thereto. The reaction was performed under reflux conditions for about half day and the reaction solution was extracted with distilled water/toluene three times to primarily remove impurities, the residue was thoroughly dissolved in toluene and the catalysts were thoroughly removed on a silica gel column. At this time, toluene was used as an eluent and polycarbazole having a Br terminal group (hereinafter, referred to as "PCz-Br") with a high molecular weight was finally obtained by Soxhlet extraction (methanol, acetone, hexane and chloroform, in order) so as to reduce PDI.

To measure the molecular weight of the synthesized polymer with a Br-terminal alkyl and a ratio of a Br-terminal monomer actually linked, analysis was performed by NMR and GPC. As a result, a polymer having a Br content of 5 mol %, a molecular weight of 16,600 g/mol and a PDI of 1.82 was obtained (see Reaction Scheme 2).

(b-2) Preparation of Polycarbazole Copolymer Having Number Average Molecular Weight of 6 kDa and Br Content of 10 mol %

Three monomers, i.e., 9-heptadecanyl 2,7-bis(4,4,5,5-tetramethyl-1,3,2-dioxaborolan-2-yl)-9H-carbazole (0.9 eq.) of Formula 5, 2,7-dibromo-9-(1-octylnonyl)-9H-carbazole (0.8 eq.) of Formula 6, and 2,7-dibromo-9-(8-bromooctyl)-carbazole (0.2 eq.) of Formula 7 obtained in step (a) were dissolved in 12 mL of toluene and 4.8 mL of a 2M $K_2CO_3$ aqueous solution. The subsequent reaction was the same as in synthesis of (b-1) polycarbazole copolymer having with molecular weight of 17 kDa. As a result, a polymer having a Br content of 10 mol %, a molecular weight of 6,300 g/mol and a PDI of 1.84 was obtained (see Reaction Scheme 2).

[Reaction Scheme 2] Rate determination step

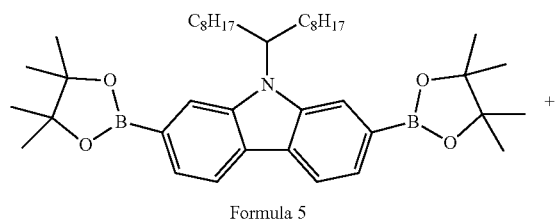

Formula 5

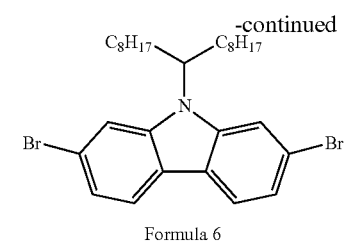

Formula 6

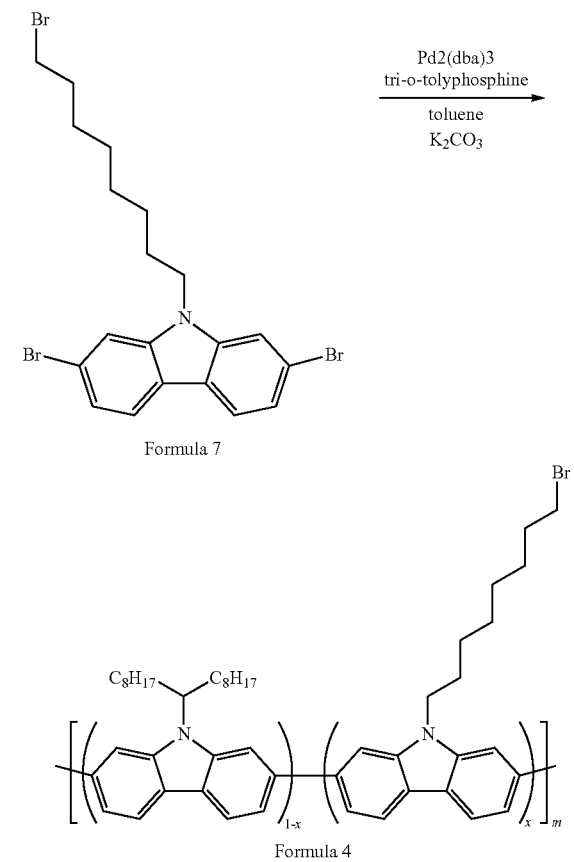

Formula 7

Formula 4

(c) Substitution of Br Functional Group with $N_3$ Functional Group

For click reaction, the Br functional group of b-1 and b-2 (Formula 4) prepared in step (b) was substituted with an azide ($N_3$) functional group to prepare a polycarbazole polymer having a number average molecular weight of 17 kDa and a Br content of 5 mol % (Preparation Example 1-1) and a polycarbazole polymer having a molecular weight of 6 kDa and a Br content of 10 mol % (Preparation Example 1-2).

Specifically, 85 mg of the polycarbazole polymer having a Br content of 5 mol % (Preparation Example1-1), as the polymer of Formula 4, was reacted with 8 eq. of $NaN_3$ and 8 eq. of 18-crown-6 in THF/DMF (2:1) at 40° C. for about 8 hours to synthesize 80 mg of 5 mol % azide-terminal polycarbazole (PCz-azide) (see Reaction Scheme 3). The polycarbazole polymer having a molecular weight of 6 kDa and a Br content of 10 mol % (Preparation Example 1-2) was replaced by an azide functional group in the same manner as in the polycarbazole polymer having a number average molecular weight of 17 kDa and a Br content of 5 mol % (Preparation Example 1-1).

[Reaction Scheme 3]

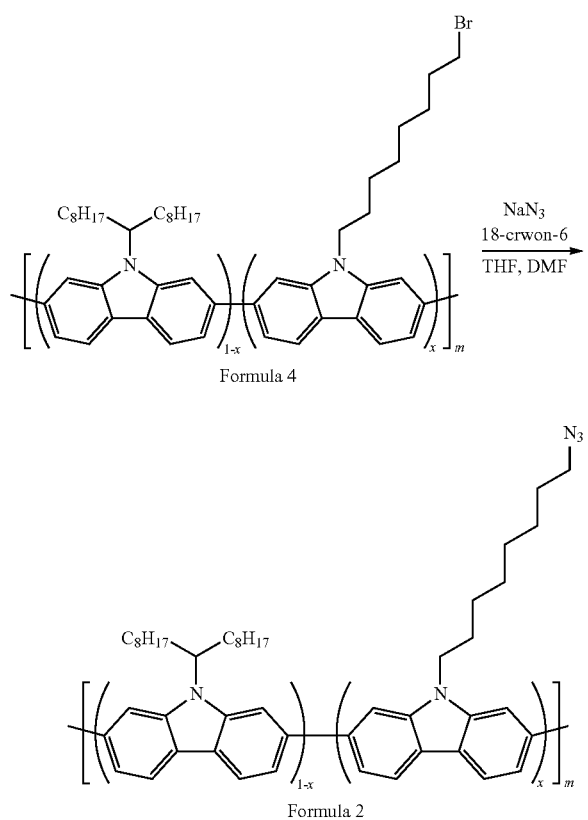

Preparation Example 2: Preparation of Poly(Lactic Acid) Polymer

Polymerization of Poly(Lactic Acid) with Alkyne Terminal Group by Ring-Opening Polymerization (a-1) Preparation of Poly(Lactic Acid) Polymer with Number Average Molecular Weight of 4 kg/mol In order to link poly(lactic acid) to polycarbazole having an azide terminal group by click reaction, poly(lactic acid) having an alkyne terminal group was polymerized by the following process. First, (R,R)-3,6-dimethyl-1,4-dioxan-2,5-dion (1 eq.) was put in a round bottom flask and vacuum was created for 30 minutes to thoroughly remove moisture from the monomer. After creating a nitrogen atmosphere, (R,R)-3,6-dimethyl-1,4-dioxan-2,5-dion and Tin(2+) bis(2-ethylhexanoate)(0.72 mol %) as a catalyst were dissolved with in 4 ml of toluene. After vacuumizing the reactor by degassing, an initiator that was dissolved in toluene was added at 110° C. and polymerization cycle was performed for 12 hours. In order to impart alkyne to a terminal group, prophage alcohol was selected as an initiator. After completion of reaction, precipitates were collected in methanol to purify the monomer, and precipitates were collected in hexane again to purify the catalyst. In order to confirm the molecular weight, PDI and terminal group of the synthesized poly(lactic acid) having an alkyne terminal group, analysis was performed by NMR and GPC. By controlling the amount of the initiator, poly(lactic acid) having a number average molecular weight of 4 kg/mol was synthesized (see Reaction Scheme 4).

(a-2) Preparation of Poly(Lactic Acid) Polymer with Number Average Molecular Weight of 6 kg/mol In the same manner as in (a-2) described above, poly (lactic acid) having a number average molecular weight of 6 kg/mol was synthesized by controlling the amount of initiator (see Reaction Scheme 4).

[Reaction Scheme 4]

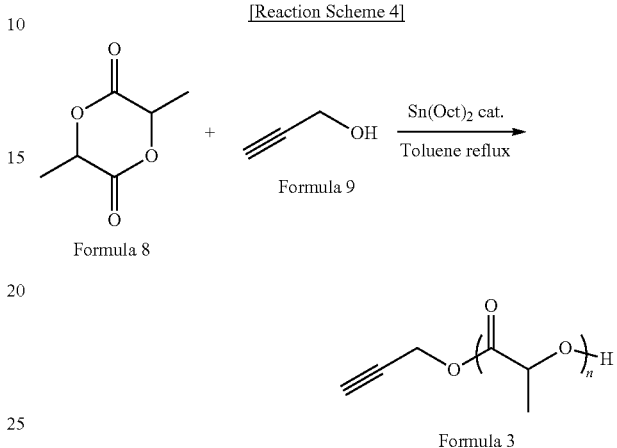

Comparative Example 1 and Examples 1 and 2: Preparation of PCz-g-PLA Graft Copolymer A PCz-g-PLA graft copolymer (Formula 1) shown in Table 1 below was synthesized by click reaction using the carbazole copolymer (Formula 2) of Preparation Examples 1-1 and 1-2, and the poly(lactic acid) polymer (Formula 3) of Preparation Example 2. As can be seen from Table 1 below, Comparative Example 1 was synthesized by reacting PCz-azide having a molecular weight of about 17 kDa with PLA-alkyne having a molecular weight of 6 kDa. In addition, PLA-alkynes with different molecular weights (4 kDa and 6 kDa) corresponding to 100 mg of PCz-azide having a molecular weight of about 6 kDa were reacted to synthesize graft copolymers of Examples 1 and 2.

Specifically, the average content of azide ($nN_3$) actually linked to one PCz having an azide-terminal alkyl side chain was calculated ($nN_3$=molecular weight of PCz/average carbazole monomer molecular weight*grafting density), and the number of moles of PLA corresponding to 2 eq. of the number of moles of azide of PCz 100 mg (100 mg/molecular weight of PCz*nN3) to be reacted was weighed and then put into a microwave vial. In addition, 1 eq. of CuBr corresponding to the number of moles of azide was weighed and put, 10 mL of high grade THF was added, the inlet was closed, and nitrogen bubbling was conducted for one hour to remove as much oxygen and moisture present in the solvent as possible. Then, 1 eq. of N,N,N',N''',N''-pentamethyldiethylenetriamine (PMDETA) was added, additional nitrogen bubbling was performed for 5 minutes, reaction was performed in a microwave reactor at 60° C. for about 2 hours, precipitates were collected with methanol, catalysts were removed and the desired compound was obtained. Due to excess addition amount, a great amount of PLA remained unreacted. The remaining PLA was completely removed by Soxhlet extraction with hot methanol for 12 hours (see Reaction Scheme 5).

[Reaction Scheme 5]

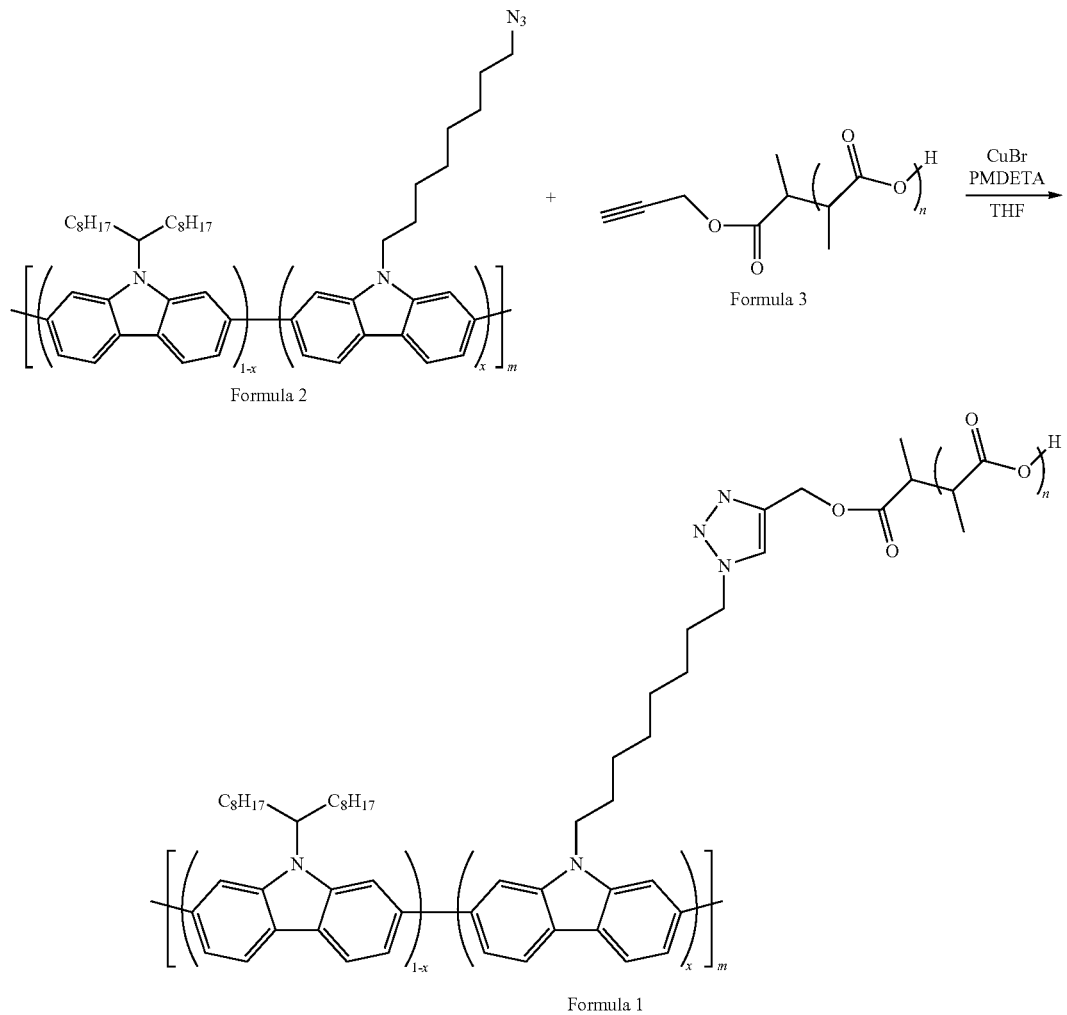

TABLE 1

Types and amounts of polymers used in
Comparative Example 1 and Examples 1 and 2

| Item | Graft copolymer | PCz molecular weight | PCz weight | PLA molecular weight | PLA weight |
|---|---|---|---|---|---|
| Comparative Example 1 (P1) | PCz17k-g5-PLA6k | 17 k | 100 mg | 6 k | 150 mg |
| Example 1 (P2) | PCz6k-g10-PLA4k | 6 k | 100 mg | 4 k | 200 mg |
| Example 2 (P3) | PCz6k-g10-PLA6k | 6 k | 100 mg | 6 k | 300 mg |

Test Example 1: Confirmation of Reactivity

Measurement of FT-IR Spectroscopy

In order to confirm whether PCz-azide was left behind after click reaction, FT-IR Spectroscopy was measured for Comparative Example 1, Examples 1 and 2 and results are shown in FIG. 1. As can be seen from FIG. 1, a peak at 2,100 $cm^{+1}$ corresponding to azide which had been well-known in a conventional PCz-azide was not observed in Comparative Example 1, and Examples 1 and 2, which means that click reaction was completed.

(2) Measurement of Size Exclusion Chromatography

Figure 2A:
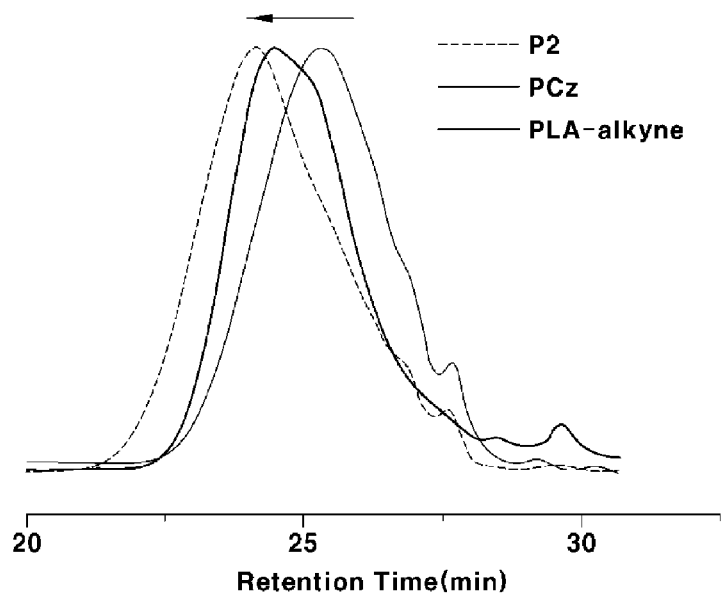
FIGS. 2A and 2B show size exclusion chromatography (SEC) measurement results of P2 (FIG. 2A) and P3 (FIG. 2B).
Figure 2B:
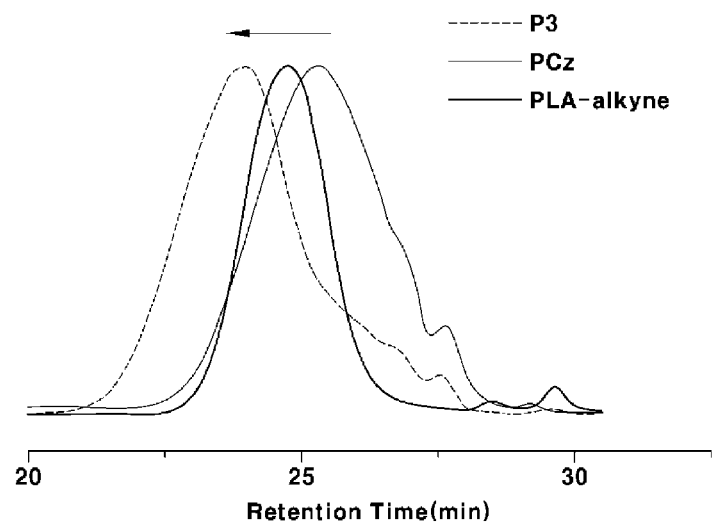
Figure 3:
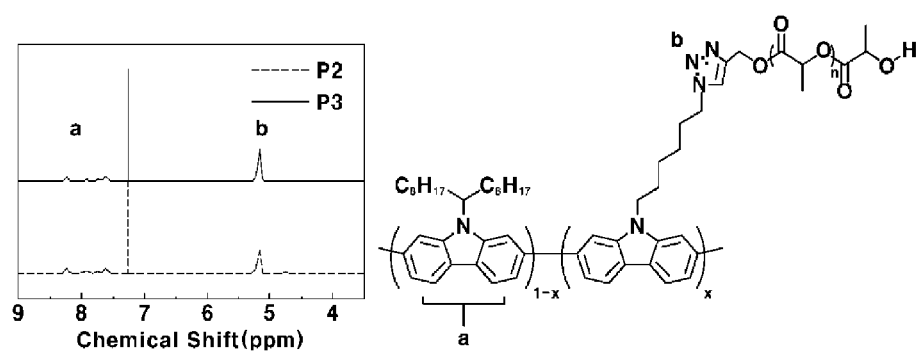
FIG. 3 shows $^1$NMR spectrum measurement results.

Furthermore, size exclusion chromatography (SEC) was performed and results are shown in FIG. 2. As can be seen from FIG. 2, there were neither PCz-azide homopolymer residues nor PLA-alkyne homopolymer residues, and peaks of Comparative Example 1, and Examples 1 and 2 were shifted to molecular weights higher than those of homopolymers (PCz-azide homopolymer, PLA-alkyne homopolymer).

Test Example 2: Measurement of $^1$H NMR Spectrum

The copolymer of Comparative Example 1 has a structure in which 2.1 graft PLA chains are linked to each PCz-g-PLA graft copolymer and copolymers of Example 1 and 2 have a structure in which 2.1 graft PLA chains are linked to each PCz-g-PLA graft copolymer.

The structures were measured by $^1$H NMR and the volume fraction of PLA was controlled using PLAs having various molecular weights of 4 kg/mol and 6 kg/mol. Volume fraction values shown in Table 2 below were obtained by NMR. Specifically, the copolymer of Example 1 exhibited the result of fPLA=0.52 and the copolymer of Example 2 exhibited the result of fPLA=0.61. In this case, the copolymer of Comparative Example 1 was not dissolved well in the solvent for NMR measurement and it was thus difficult to obtain a measurement value.

TABLE 2

Types and amounts of polymers
used in Comparative Example and Examples

| Graft copolymer | Integration of a | Integration of b | fPLA[a] | Calculated Mn, PLA[b] [kg/mol] | Mn, PLA from NMR [kg/mol] |
|---|---|---|---|---|---|
| Example 1 (P2) | 6 | 6.66 | 0.52 | 4.7 | 4 |
| Example 2 (P3) |  | 9.66 | 0.61 | 6.8 | 6 |

Test Example 3: Control and Observation of Morphology

In order to observe the self-assembly property, the morphologies of PCz-g-PLA graft copolymers of Comparative Example 1, and Examples 1 and 2 were realized by a microwave reactor and were observed using transmission electron microscopy (TEM) and small-angle X-ray scattering (SAXS).

(a) Microwave Annealing

Figure 4:
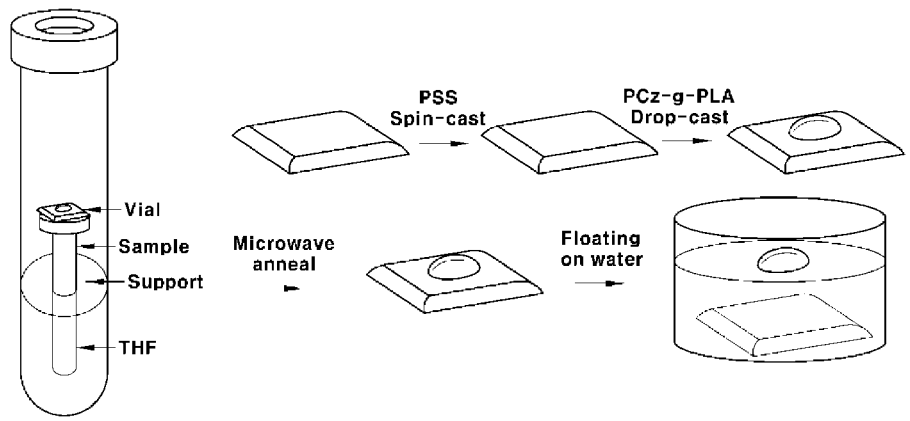
FIG. 4 is a schematic view illustrating a process of microwave-solvent annealing.

In order to analyze morphologies of PCz-g-PLA graft copolymers (polymer) of Comparative Example 1, and Examples 1 and 2, annealing was performed, as shown in FIG. 4. The most general thermal annealing including annealing at a temperature of Tm or higher for a long time was impossible due to a low degradation temperature of PLA. Accordingly, microwave-solvent annealing was performed using a THF solvent having excellent solubility to both PCz and PLA. The microwave-solvent annealing advantageously remarkably shortened a conventional long annealing time and reduced the proportion of structural defects in the morphology. First, to separate a silicon wafer and a polymer sample from each other well, poly(styrenesulfonate) (PSS) was spin-coated to a thickness of 30 to 50 nm. The PCz-g-PLA graft copolymer (polymer) was dissolved in chloroform, drop-cast on a silicon wafer to which PSS was applied and then annealed in a microwave vial (2-5 ml) containing 1 ml of THF at 180° C. for 10 minutes. After annealing, the PCz-g-PLA graft copolymer (polymer) sample was floated on water to separate a bulk sample from the silicon wafer, and epoxy was molded to produce a final PCz-g-PLA graft copolymer (polymer) sample.

(b) Observation Using Transmission Electron Microscopy (TEM) and Small-Angle X-ray Scattering (SAXS)

In order to observe the morphology of the polymer sample prepared in step (a) by transmission electron microscopy (TEM), a sample with a thickness of 50 nm should be produced. For this purpose, a thin section with a thickness of 50 nm was created from the molded epoxy using an ultramicrotome, PLA was selectively stained with ruthenium tetroxide, morphology was observed by transmission electron microscopy (TEM), and results are shown in FIG. 5. Furthermore, the morphologies were observed by small-angle X-ray scattering (SAXS) and results are shown in FIG. 6.

Figure 5A:
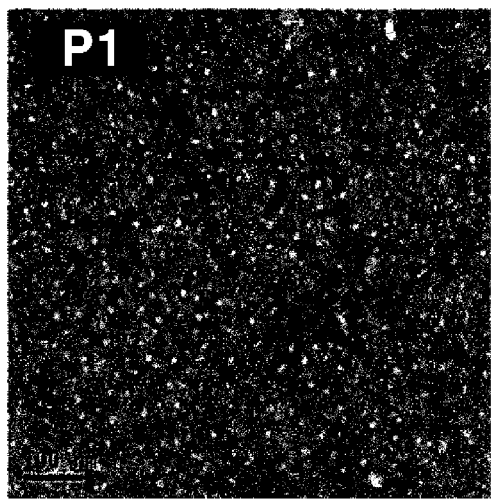
FIGS. 5A, 5B, and 5C show transmission electron microscope (TEM) results of P1 (FIG. 5A), P2 (FIG. 5B), and P3 (FIG. 5C).
Figure 6A:
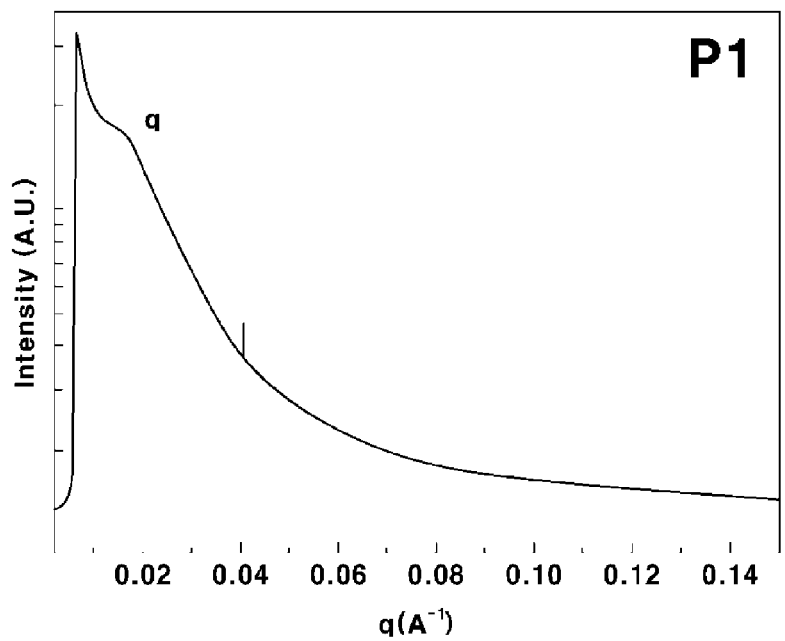
FIGS. 6A, 6B, and 6C show small-angle X-ray scattering (SAXS) measurement results of P1 (FIG. 6A), P2 (FIG. 6B), and P3 (FIG. 6C).
Figure 6B:
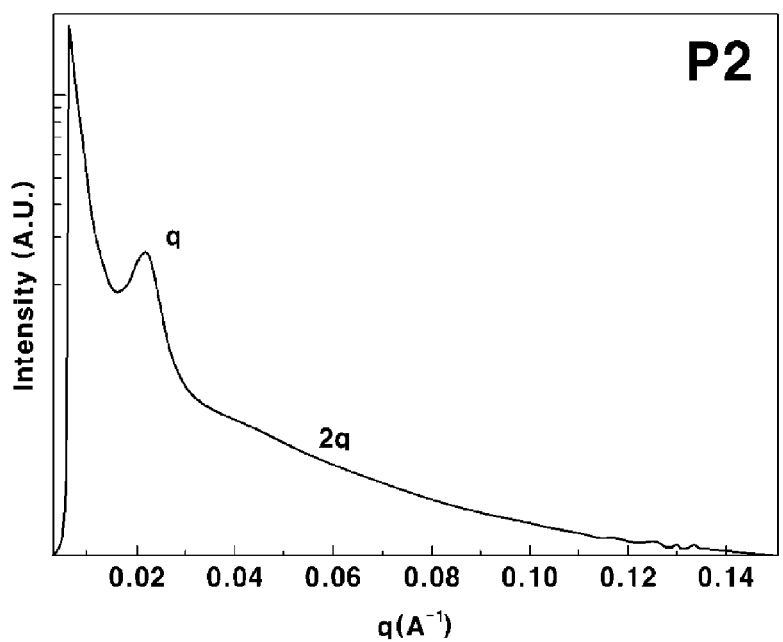
Figure 6C:
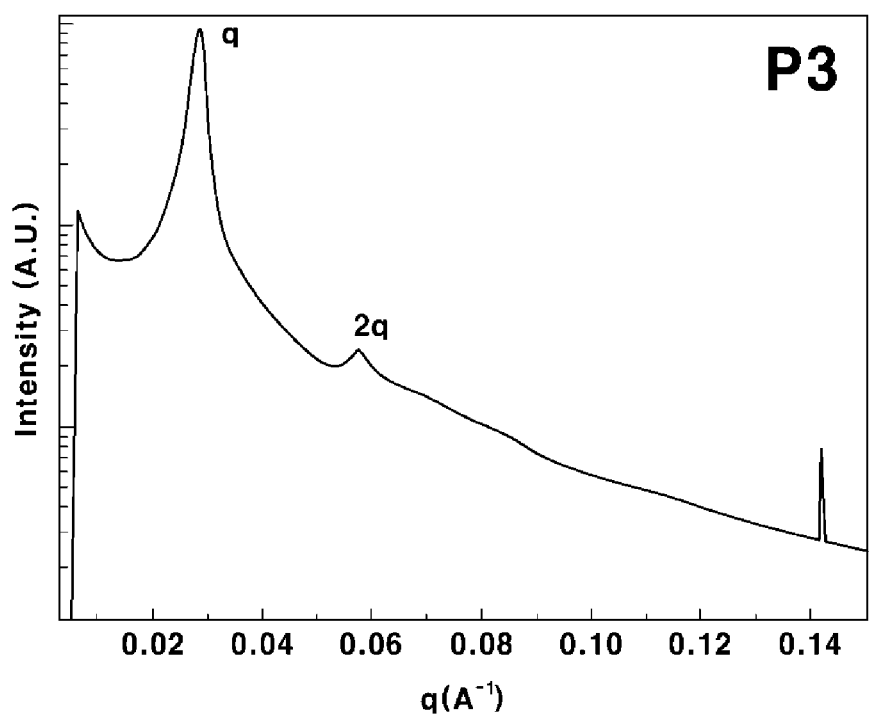

As can be seen from FIG. 5(a), when the molecular weight of PCz as a rod polymer was excessively high to 17 kDa, phase separation was not performed efficiently by microwave annealing due to increased rod-rod interaction and the necessity of relatively more energy to shift the morphology. As a result, any ordering was not observed in an SAXS graph, as shown in FIG. 6(a).

Figure 5B:
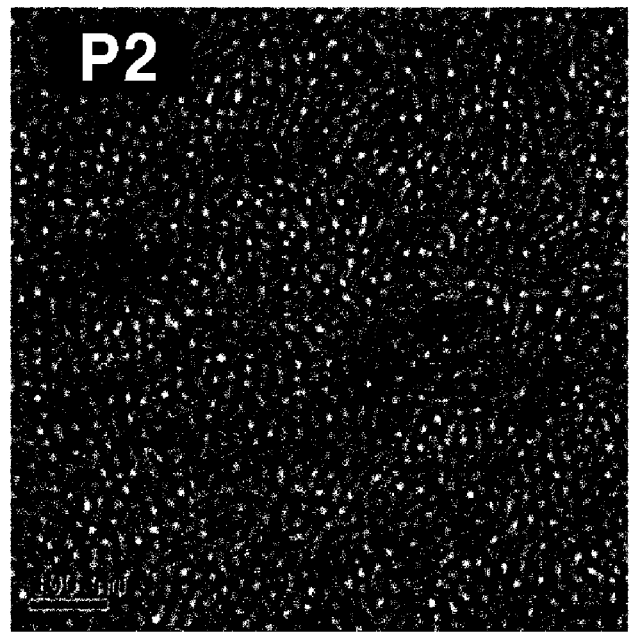
Figure 5C:
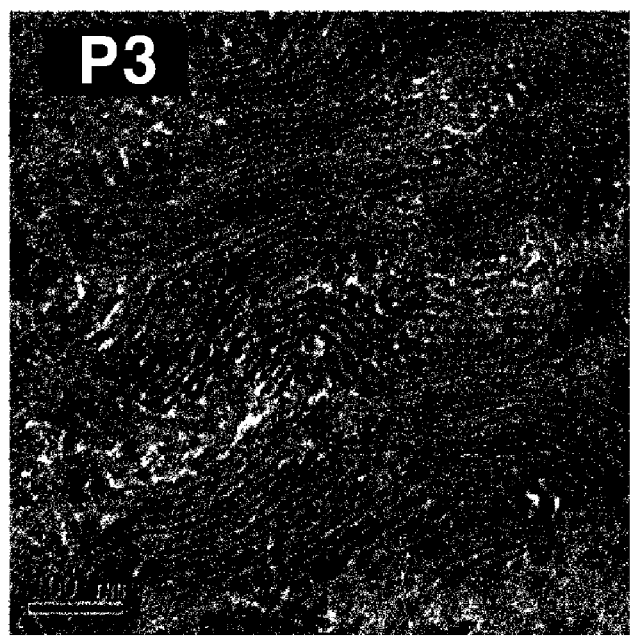

Meanwhile, as can be seen from FIGS. 5(b) and 5(c), when the molecular weight of PCz was sufficiently decreased to 6 kDa, phase separation was performed efficiently and nano-scale morphology was realized by microwave annealing due to significantly decreased rod-rod interaction. In particular, when fPLA was 0.52, a PLA cylinder was provided in a PCz main matrix. In addition, as can be seen from the SAXS graph of FIG. 6(b), domain spacing was maintained at about 29.2 nm.

In addition, as can be seen from FIG. 5(c), when fPLA was increased from 0.52 to 0.61, morphology was changed from cylinder to lamella. In addition, as can be seen from the SAXS graph of FIG. 6(c), domain spacing of lamellar phases was about 22.0 nm (Example 1 (q1)=0.285 nm$^{-1}$, Example 2 (q2)=0.570 nm$^{-1}$) and such lamellar structures were continuously stacked in parallel to a silicon oxide substrate over the film.

In a general block copolymer, when a volume ratio between one polymer and another polymer was 1:1, a lamellar structure of fPLA=0.5 was observed. This means that lamellar morphology was realized in a graft copolymer due to structural properties although the volume ratio of the conductive polymer, PCz was relatively low.

Accordingly, the poly(carbazole)-coil graft copolymer according to the present invention can advantageously realize various nano-structures by forming a self-assembled structure and can thus be widely used as a key technology for interface control and nano-structures of electrode materials.

As apparent from the foregoing, the novel graft copolymer according to the present invention has an advantage of realizing a variety of nano-structures by grafting a coil copolymer block between conductive polymers and can prevent steric hindrance created by rod-rod interaction of conventional block copolymers. In addition, the three-dimensional porous structure formed by removing a sacrificial block of poly(lactic acid) (PLA) according to the present invention can be widely used as a key technology for interface control and nano-structures of electrode materials.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A carbazole-based graft copolymer capable of controlling a self-assembled structure represented by the following Formula 1:

[Formula 1]

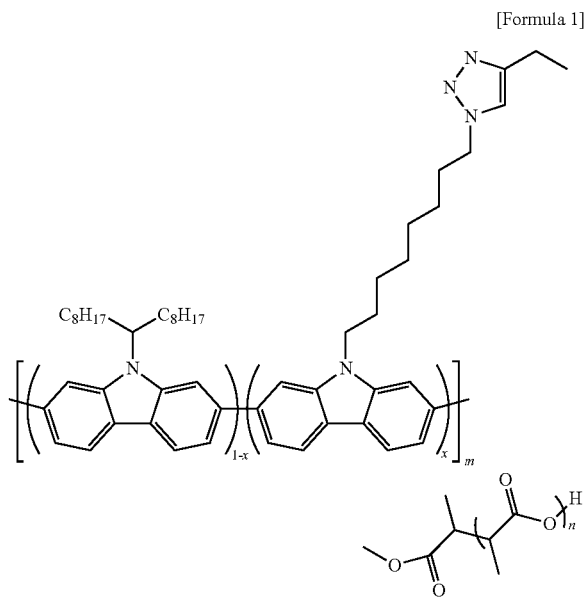

wherein X represents 0.05 to 0.1, m represents an integer of 7 to 8 and n represents an integer of 56 to 84.

2. The carbazole-based graft copolymer according to claim 1, wherein a carbazole-based copolymer as a main chain in the copolymer of Formula 1 has a number average molecular weight of from about 5,000 to 7,000 g/mol and a poly(lactic acid) copolymer as a side chain therein has a number average molecular weight of from about 4,000 to 6,000 g/mol.

3. A method of preparing a carbazole-based graft copolymer capable of controlling a self-assembled structure comprising click-reacting a polycarbazole copolymer represented by the following Formula 2 with a poly(lactic acid) polymer represented by the following Formula 3 to synthesize a carbazole-based graft copolymer represented by the following Formula 1:

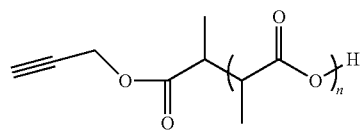

[Formula 3]

wherein X represents 0.05 to 0.1, m represents an integer of 7 to 8, and n represents an integer of 56 to 84.

4. The method according to claim 3, wherein the copolymer of Formula 2 is produced by substituting a bromine (Br) functional group of a polycarbazole copolymer represented by the following Formula 4 with azide ($N_3$):

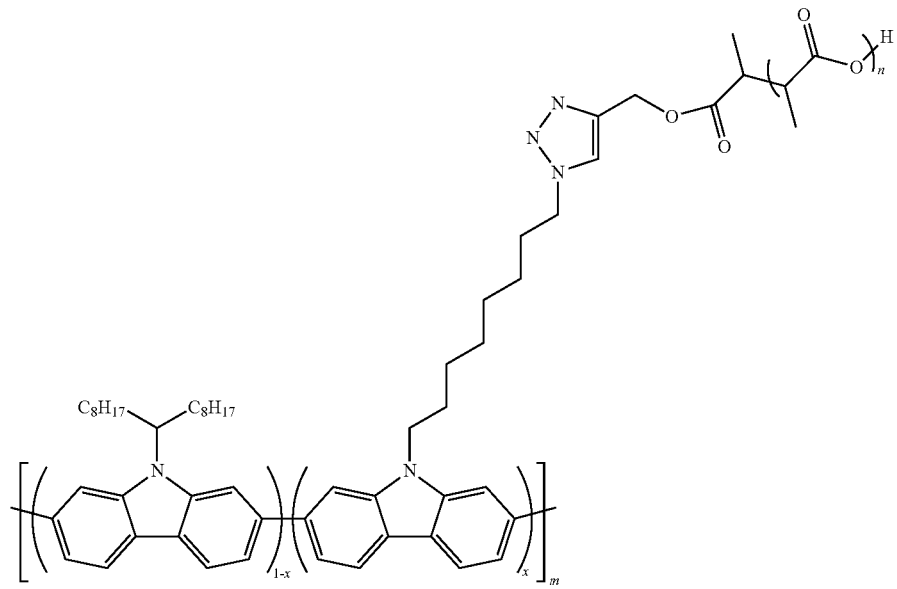

[Formula 1]

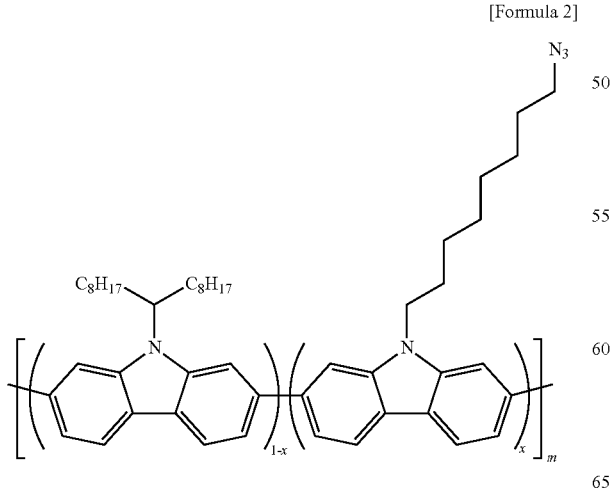

[Formula 2]

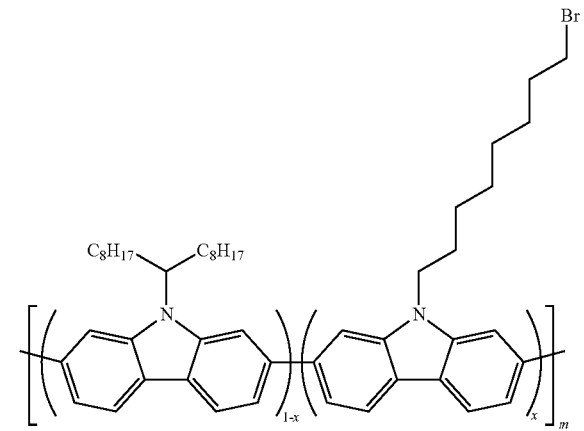

[Formula 4]

wherein X represents 0.05 to 0.1 and m represents an integer of 7 to 8.

5. The method according to claim 4, wherein the copolymer of Formula 4 is produced by polymerizing a carbazole monomer represented by the following Formula 5, a carbazole monomer represented by the following Formula 6 and a carbazole monomer represented by the following Formula 7, wherein the polymer of Formula 4 has a bromine (Br) content of 5 to 10 mol %, a number average molecular weight of from about 5,000 to 7,000 g/mol and a PDI of from about 1.5 to 2

[Formula 5]

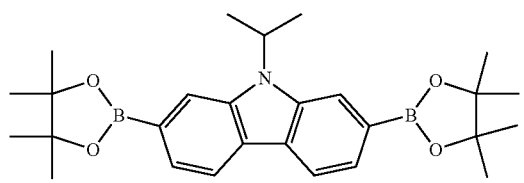

[Formula 6]

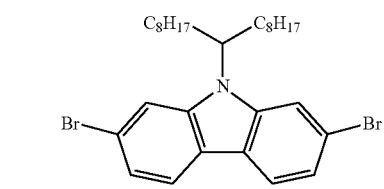

[Formula 7]

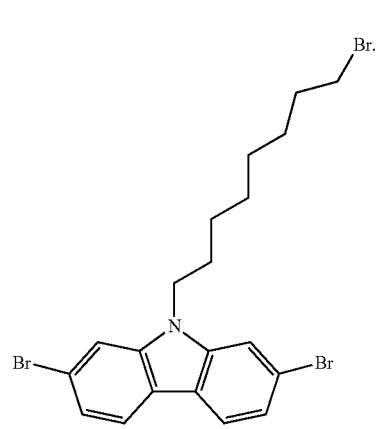

6. The method according to claim 3, wherein the polymer of Formula 3 is produced by polymerizing a lactone compound represented by the following Formula 8 with an alcohol compound represented by the following Formula 9, wherein the polymer of Formula 3 has a number average molecular weight of from about 4,000 to 6,000 g/mol

[Formula 8]

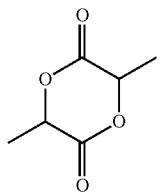

[Formula 9]

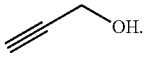

* * * * *